Aug. 11, 1959    A. A. NEMET    2,899,560
RADIATION DETECTOR
Filed March 19, 1957
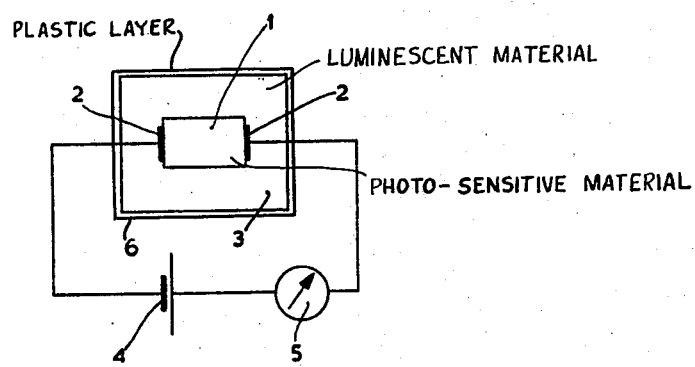
INVENTOR
ANTHONY ANTAL NEMET
BY
AGENT

United States Patent Office 2,899,560
Patented Aug. 11, 1959

2,899,560

RADIATION DETECTOR

Anthony Antal Nemet, Richmond, England, assignor to North American Philips Company, Inc., New York, N.Y., a corporation of Delaware Application March 19, 1957, Serial No. 647,142

Claims priority, application Great Britain February 19, 1957

3 Claims. (Cl. 250—71)

This invention relates to luminescent radiation detectors for X-rays or gamma rays, comprising a material which becomes luminescent by the action of irradiation. Their operation is based upon the occurrence of individual light flashes which may be produced in so rapid a sequence that a substantially continuous impression of light is obtained. The frequency of the light flashes serves as a measuring value in the analysis of materials by means of X-rays or gamma rays. For dose measurements with irradiation by X-rays or gamma rays use is made either of the light output per unit-time or of the whole light output.

It is known to utilize a luminescent detector in measurements of nuclear radiations in which a photo-sensitive voltage cell is arranged in direct proximity to the detector and the activity of the cell is measured by means of a micro-ammeter or a galvano-meter. With nuclear reactors such a combination may be fixedly arranged, but if measurements are to be carried out at different areas, the arrangement is liable to vary a little so that the results obtained are not always comparable.

The object of the invention is to avoid this disadvantage. It provides a radiation detector having properties which are not varied by variation in the area of arrangement. According to the invention, the luminescent material is provided on the surface of a moulding of photo-sensitive semi-conductive material arranged between two electrodes. In this case a fixed coupling exists between the luminescent material and the semi-conductor, but due attention must be paid to the direction of the rays to be measured, since the luminescent material must preferably be situated between the source of rays and the semi-conductor. This condition, which is not particularly troublesome per se, is always fulfilled if the moulding is embedded in the luminescent material. For protection of the luminescent material, it is possible to provide a layer of high permeability for the rays to be measured, for example a layer of polyvinyl toluene or polystyrene.

Luminescent materials for the use described are known. Those most commonly employed have the property that the light output is dependent upon the radiation energy. This is a property unfavourable for dose measurements, since the sensitivity of the detector thus varies with the hardness of rays. Materials are known which increase their light output with harder rays, but also materials with which the opposite is the case. By mixing two kinds, for example silver-activated zinc sulphide and p-terphenyl or tetraphenyl butadiene, it is possible to obtain materials which are not particularly sensitive or substantially not sensitive to differences in hardness.

The photo-sensitive semi-conductive material employed may be a cadmium-sulphide crystal or a moulding of small cadmium-sulphide crystals sintered together.

In order that the invention may be readily carried into effect, it will now be described more fully, by way of example, with reference to the accompanying drawing, showing one embodiment of the luminescent radiation detector according thereto.

A cadmium-sulphide crystal 1 comprises electrodes 2 arranged on opposite surfaces. The crystal is surrounded by the luminescent material 3. A voltage is applied between the electrodes 2 by means of a battery 4. The current in the measurement circuit is read on a measuring instrument 5. When the luminescent layer 3 is struck by X-rays or gamma rays, an electric current is produced in the measuring circuit, the deflection of the meter 5 being a measure of the radiation dose per minute. To protect the luminescent material 3, a polystyrene coating 6 is provided thereon.

What is claimed is:

1. A radiation detector comprising a coherent supporting body comprised of photo-sensitive, semi-conductive material, a pair of electrodes coupled to said coherent body, and a mass of radiation-responsive, luminescent material mounted on the surface of said body and forming an integral unit therewith and providing luminescence in response to radiant energy for actuating the photo-sensitive material.

2. A radiation detector comprising a coherent, supporting body composed of photo-sensitive, semi-conductive material, a pair of electrodes coupled to said body, and a mass of radiation-responsive, luminescent material completely surrounding and supported by said coherent body and forming an integral unit therewith and producing luminescence in response to radiant energy for actuating the photo-sensitive material.

3. A detector as set forth in claim 2 wherein a radiation-permeable synthetic resin layer envelops the luminescent material.

References Cited in the file of this patent

UNITED STATES PATENTS 2,650,310   White _____ Aug. 25, 1953
2,768,308   Schultz _____ Oct. 23, 1956